United States Patent [19]

Matt et al.

[11] 4,431,690
[45] Feb. 14, 1984

[54] CONTROLLER FOR UNIFORM FLUID DISPENSING

[75] Inventors: Timothy S. Matt, Bay Village; Ralph G. Bruening, Lorain, both of Ohio

[73] Assignee: Nordson Corporation, Amherst, Ohio

[21] Appl. No.: 371,119

[22] Filed: Apr. 23, 1982

[51] Int. Cl.³ .................... B05D 1/02; B05B 12/00
[52] U.S. Cl. ......................... 427/424; 427/9; 118/324; 118/679; 118/674; 118/683
[58] Field of Search ............. 118/674, 679, 683, 324; 427/424, 9

[56] References Cited

U.S. PATENT DOCUMENTS

| | | | |
|---|---|---|---|
| 3,175,247 | 3/1965 | Morrison et al. | 118/674 |
| 3,452,710 | 7/1969 | Hentschel | 118/674 |
| 3,874,327 | 4/1975 | Furman | 118/674 |
| 3,931,787 | 1/1976 | Kuttner et al. | 118/674 |
| 4,032,670 | 6/1977 | Warning et al. | 427/424 |

OTHER PUBLICATIONS

Drawing No. 1020012.
Rotolec 1010—Brochure.
Vorhaltrechner Lead–Controller 1020—Brochure.
The Nordson C.5 Digital Interval Controller—Brochure.

*Primary Examiner*—Shrive P. Beck
*Attorney, Agent, or Firm*—John P. Donohue, Jr.; Stephen T. Belsheim; Michael L. Gill

[57] ABSTRACT

A controller for uniformly dispensing fluid onto a substrate in response to movement between the dispensing unit and the substrate has a sensor which senses the rate of relative movement and supplies a signal reflective of the movement to an operation device which in turn generates and supplies a control signal to a regulator. The regulator is positioned in the fluid dispensing system and regulates the flow rate of the fluid to the dispensing unit so that the substrate receives a substantially uniform fluid coating per unit length. The operation device receives the signal from the sensing means and computes the rate of relative movement. The rate of relative movement is then compared to a preselected flow rate signal; and a signal is generated and supplied to the regulator reflective of the comparison between the computed rate of movement and the preselected flow rate signal, so that the flow rate of the fluid varies substantially proportionally to the rate of relative movement between the dispensing unit and the substrate so that the amount of dispensed fluid per unit length of substrate is substantially constant.

15 Claims, 3 Drawing Figures

CONTROLLER FOR UNIFORM FLUID DISPENSING

BACKGROUND OF THE INVENTION

This invention relates to a control system which dispenses fluid onto a substrate, and more particularly, to a controller which maintains relatively constant the amount of fluid per unit length dispensed onto a substrate during varying rates of relative movement between the dispenser and the substrate.

Devices for vending fluid from a dispenser onto a moving substrate are typically found in coatings and adhesive applications. For both coatings and adhesive applications the relative movement between the substrate and the dispenser varies while the rate at which the fluid is being dispensed remains constant. As a result, the fluid dispensed on the substrate may have uneven thickness.

In some cases there may be insufficient material such that the quality of the product is unacceptable. In other cases the material may be too thick, wasting material, and which may also have an adverse effect on quality. A device or system to closely regulate the dispensed fluid would be useful to reduce the amount of excess material dispensed and otherwise to improve or assure the quality of the produced end product.

To solve the above problem in the adhesives area, the Ingenieurburo Hamprecht Company has developed a timer containing a module which attempts to modify the flow rate of the dispensed adhesive in proportion to a conveyor line speed. This particular module would appear to count a number of pulses from a pulse generator positioned to convert the movement of a substrate conveyor into a pulse signal for a selected period of time and thereafter latch the pulse count and present it to a digital to analog converter. The converter effects a current in a control mechanism which regulates the flow rate of adhesive to a dispensing unit. The module also supplies a minimum control signal by adding current to the current established by the converter. One of the major drawbacks of this system is with the summation of totaling of current to provide a minimum flow rate signal. By adding current, the velocity at which maximum flow rate occurs is lessened because the current necessary to achieve maximum flow rate is reached sooner. To correct this condition such that maximum flow rate is not reached until desired, the time period selection member must be experimentally varied until the desired condition occurs. As can be seen, the desired condition is not selected by establishing a fixed time constant. Accordingly, inaccuracies will inevitably result from the inability to select and maintain a time constant in which maximum flow rate occurs at a desired velocity.

SUMMARY OF THE INVENTION

The instant invention regulates the dispensed fluid in relation to substrate relative movement by principally controlling the flow rate of the fluid in response to the rate of relative movement between the dispensing unit and the substrate.

It is an object of the instant invention to provide a controller which can regulate the amount of fluid dispensed onto a substrate in response to the relative movement between the dispensing unit and the substrate such that the amount of fluid deposited remains substantially constant per unit length of substrate.

This and other objects are accomplished by a controller that has a sensor which senses the relative movement between a substrate and a dispenser and which generates a signal reflective of the movement. The controller also has a regulator for regulating the flow rate of the fluid in response to a control signal. An operation device receives the sensor signal; computes the rate of relative movement; compares the rate of relative movement to a preselected flow rate signal; and generates a control signal to the regulator reflective of the comparison between the computed rate of movement signal and the preselected flow rate signal, so that the flow rate of the fluid varies substantially proportionally to the rate of relative movement between the dispensing unit and the substrate so that the amount of dispensing fluid per unit length of substrate is substantially constant.

It is also desirable to maintain a minimum flow rate on the fluid when relative movement has stopped. If a pump is used to establish the flow rate, maintaining this minimum rate allows the fluid pump to continue internal movement. The forces of the dispensed fluid are generally resistive of movement of pump components, especially pronounced in adhesive dispensing applications. If the pump were to stop, the force necessary to overcome the resistive fluid forces would contribute to varying amounts of fluid being dispensed per unit length of substrate. The instant invention overcomes this problem by maintaining a minimum flow rate, such that the pump is moving during periods when relative movement between dispenser and substrate has ceased.

BRIEF DESCRIPTION OF THE DRAWINGS

These and other features, objectives and advantages of the invention will become more readily apparent from a detailed description thereof taken in conjunction with the drawings, in which.

DESCRIPTION OF THE ILLUSTRATED EMBODIMENT

Figure 1:
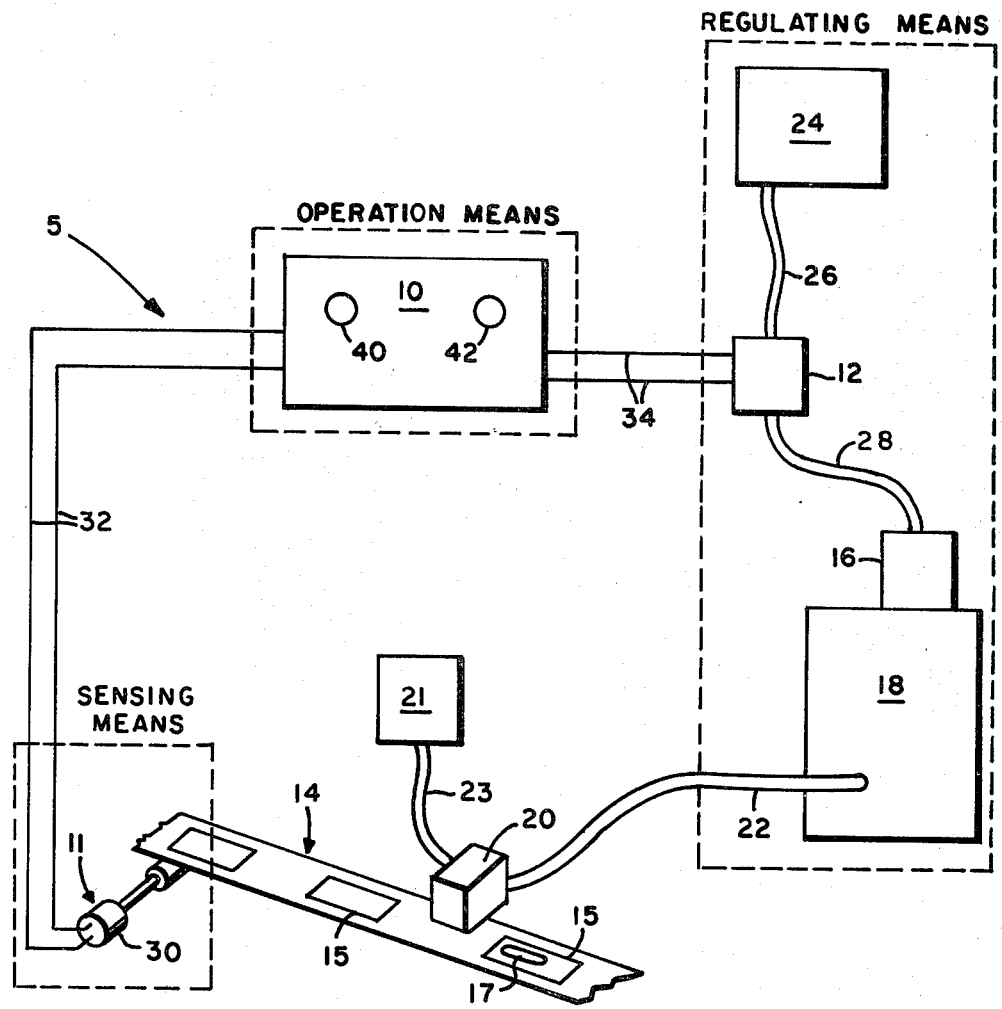
FIG. 1 is a diagrammatic view of the instant invention incorporated into a hot melt adhesive application.

A controller for dispensing fluid from a dispensing unit onto a substrate in a response to the relative movement between the dispensing unit and the substrate is depicted in FIG. 1 and generally referred to as 5. Controller 5 is connected to control the rate of fluid supplied to dispensing unit 20 and thereupon onto substrate 15. The controller 5 includes sensor 11, operation device 10 and regulator 12. Sensor 11 senses the relative movement between substrate 15 and dispensing unit 20 and generates a signal reflective of the movement. Operation device 10 receives the signal from sensor 11, computes the rate of relative movement from the movement signal; compares the rate of relative movement to a preselected flow rate; and generates a control signal to regulator 12 reflective of the comparison between the computed rate of movement signal and the preselected flow rate signal, so that the flow rate varies substantially proportionally to the rate of relative movement between the dispensing unit and the substrate so that the amount of dispensed fluid per unit length of substrate is substantially constant.

If used in conjunction with pumping apparatus having particular utility in coating application, such as that described in U.S. Pat. No. 3,827,339—Rosen et al., assigned to the same assignee of the instant invention, the regulation of air used to drive the pump will in effect control the rate of the material ultimately dispensed onto the substrate.

As depicted in FIG. 1, regulator 12 is operable to regulate the rate driving fluid from source 24 through conduit 26 and 28 to pump 16. The fluid used to drive pump 16 typically, is a gas. Pump 16 forces dispensed fluid 17 from container 18 through conduit 22 to dispensing unit 20, where it is vended onto substrate 15. Actuator 21 causes a control signal, preferably but not necessarily electrical in nature, to be transmitted by member 23 to dispensing unit 20 to actuate the vending of fluid 17. A controller such as that described in U.S. Pat. No. 4,166,246 can be utilized.

A pulse generator 30 is positioned such that the movement of conveyor 14 is incrementally encoded and transmitted via conductors 32 to apparatus 10. Conveyor 14 is caused to move past dispenser 20 by a conventional means (not shown in the drawings) well known in the art and not a part of the present invention.

In adhesive application where principal use of the invention described herein is envisioned, the substrate is typically conveyed beneath a stationary dispensing device. Adhesive is dispensed under pressure from apparatuses such as those described in U.S. Pat. No. 3,585,361—Rosen et al.; U.S. Pat. No. 3,827,603—Reighard et al.; and U.S. Pat. No. 4,009,974—Scholl, all assigned to the assignee of the instant invention. In each of these applications adhesive is first melted by a heated grid or reservoir and is thereafter pumped under pressure to a dispensing device. Each of the described pumping systems can be fluid (e.g., air) driven. If the fluid flow rate used to drive these pumping systems is varied, the rate of the adhesive conducted to the dispensing device also changes.

Operation device 10 also includes means to generate a minimum flow rate signal so that the signal provided to regulator 12 varies the flow rate of the fluid substantially proportionally to the rate of relative movement above the minimum flow rate signal. The control signal transmitted through connectors 34 to regulator 12 can be large enough such that movement is maintained in pump 16 when the relative movement of the system is zero. The minimum flow rate is programmed into operation device 10 by turning variable resistor knob 42, the operation of which will be more specifically described in conjunction with FIG. 2. If dispensing unit 20 is selectively dispensing fluid, rather than continuous operation, it will of course be necessary to equip pump 16 or conduit 22 with a pressure relief or pressure operated by-pass device. This will prevent pressure from building in the conduit to the point of rupture or in a rush of fluid being dispensed when unit 20 is opened. Such devices are well known in the art.

Figure 2:
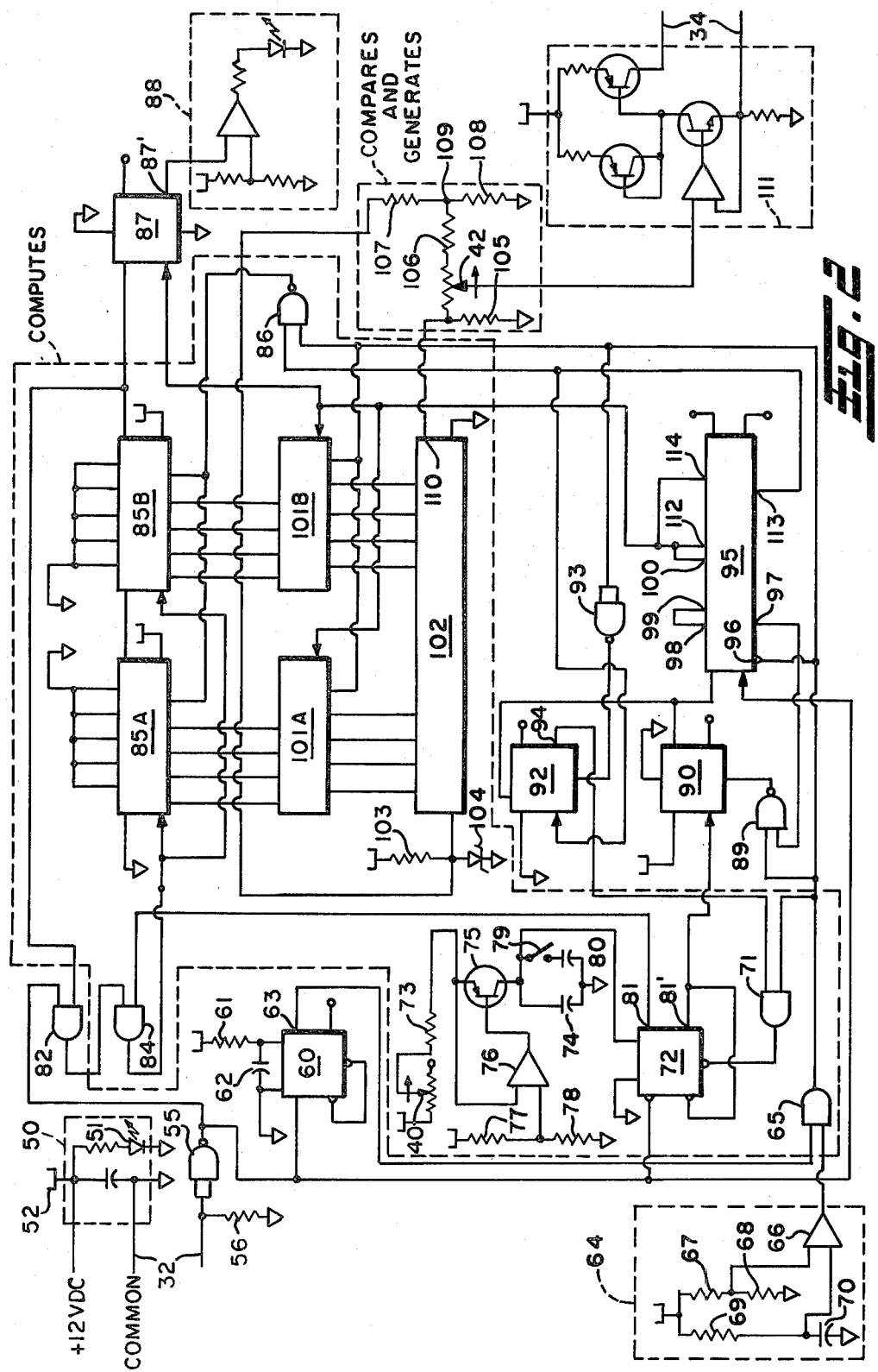
FIG. 2 is a circuit diagram of the operation device for use with the instant invention.

With reference to FIG. 2, there is shown a circuit diagram of the operation device 10. A 12 volt DC signal is applied to the circuit generally for the purposes of activating those components requiring threshold voltages to be operational, and also, to provide reference voltages. The voltage is initially applied to activation indication circuitry 50. Light emitting diode 51 is incorporated in circuit 50 such that when voltage is being applied to activate apparatus 10 the operator receives a visual indication. Eminating from circuit 50 is voltage indication point 52. This voltage indication point appears several times throughout the circuit shown in FIG. 2. This representation, as one of ordinary skill in the art will comprehend, indicates that a 12 volt DC voltage is being applied at that point. Similarly, the triangle 53 indicates to one of ordinary skill in the art that every point in the circuit disclosed in FIG. 2 where that symbol appears is connected to the common reference.

Figure 3:
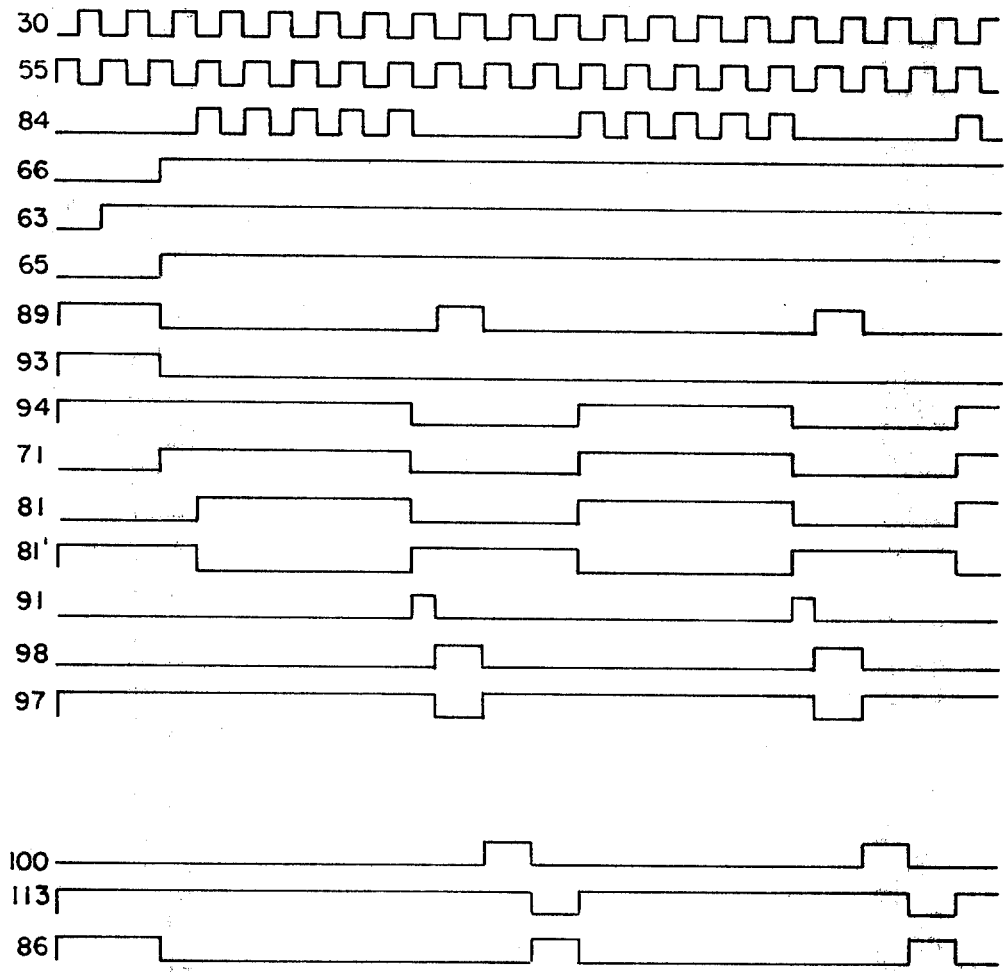
FIG. 3 is a logic timing diagram depicting the outputs of various components contained in the circuit diagram of FIG. 2.

The signal from pulse generator 30 is transmitted through conductors 32 into the circuitry of operation device 10. The signal passes through NAND gate 55 which in the preferred embodiment serves as a buffer-inverter. Resistor 56 is interposed between the input of NAND gate 55 and ground and serves to present a true "0" input when a signal is not applied to conductors 32. The tachometer signal being buffered and inverted will take a form opposite that of the tachometer signal. Such a comparison is shown at the top of FIG. 3 where the output of tachometer 30 and NAND gate 55 is shown. In the preferred embodiment, NAND gate 55 is a Motorola MC 14011BCP.

The output of NAND gate 55 is conducted directly as an input to AND gate 82, low frequency controller 60, counting duration controller 72 and controller 95. Low frequency controller 60, in the preferred embodiment, is a Motorola MC 14538BCP. If the frequency of pulses from NAND gate 55 provides a triggering input during the time constant established by resistor 61 and capacitor 62, a constant high signal will be generated at output 63. Should the triggering pulses fall below the preset frequency, such that controller 60 is not triggered within the time constant set, the signal provided to output 63 will be low, disabling AND gate 65. As can be seen in FIG. 2, the output of AND gate 65 serves to enable several key components in the circuit.

The other input of AND gate 65, which if low would serve to cause the output to be low, is from the disable circuit generally designated 64. Basically, when the 12 volt DC signal is applied to circuit 64 two input signals are provided to the differential amplifier 66. First the voltage is divided between resistor 67 and 68. Second, voltage is applied to resistor 69 and capacitor 70. This second voltage is applied to amplifier 66 in accordance with the time constant established by resistor 69 and capacitor 70. After the time period has passed, amplifier 66 operates to provide a high signal to AND gate 65 which in conjunction with a high signal from disabler 60 causes the output of AND gate 65 to go high providing high inputs to AND gate 71, NAND gate 89, controller 95, NAND gate 93, latches 101A and 101B and NAND gate 86. In the preferred embodiment differential amplifier 66 is a National LM324N, resistor 69 is ten kilohms and capacitor 70 is one microfarad.

The output of AND gate 65 for the rest of the description of the preferred embodiment will be assumed as high. AND gate 71 now has two high inputs, the output of AND gate 65 and the $\overline{Q}$ output 94. Output 94 of flipflop 92 is high because the data, set, and reset inputs are all low as will be described in more detail hereinafter. With both inputs being high, the output of AND gate 71 is high, providing a high input to the reset port of count duration controller 72. Controller 72 acts as a one shot, providing a high signal at output 81 for a preselected time period, which in the preferred embodiment is controlled by variable resistor 40. The combination of the variable resistor 40 and resistor 73 together with capacitor 74 act as an RC time constant regulator such that controller 72 provides a high output at 81 for the time constant period. In the preferred embodiment, controller 72 is a Motorole MC 14538BCP.

The preferred embodiment incorporates other electronic components into the RC circuit such that the time constant will not vary if apparatus 10 is used in an application having varying temperatures. This is accomplished by providing a substantially constant current through the RC circuit. Transistor 75 is interposed between the resistor combination and capacitor 74. The base of transistor 75 is biased by differential amplifier 76 which has as one of its inputs a reference current developed by the voltage divider circuit containing resistor 77 and 78. This current is compared to the current developed through the variable resistor and resistor 73. When amplifier 76 is operational the biasing applied to transistor 75 controls the amount of current conducted from emitter to collector and thus to capacitor 74. As the temperature goes up or down varying the capacitance of capacitor 74, the difference between the reference current and the current passing through resistor 73 varies. The biasing of the base of transistor 75 also varies causing the current conducted from the emitter to the collector to vary. Thus the time constant established by the variable resistor attached to knob 40 and resistor 73 and capacitor 74 is maintained relatively constant. A second capacitor 80 is connected in parallel with capacitor 74 by closing normally opened switch 79. The addition of capacitor 80 allows a greater range of time constants to be selected. For the purposes of discussing FIG. 3, it was assumed that the RC time constant would allow five tachometer pulses to pass through AND gate 84.

While the low frequency controller 60 and power-up disable circuit 64 are changing from low to high, pulses passing through NAND gate 55 are also being supplied to AND gate 82. The second input of AND gate 82 is a high signal provided by the output 83 of counter 85. This signal will always remain high until counters 85A and 85B have counted to their maximum count, whereupon output 83 will be provided with a low signal. Since the second input to AND gate 82 is high the output of AND gate 82 will be generally identical to the output of NAND gate 55. Thus, the input to AND gate 84 is virtually identical to the output of NAND gate 55. The second input to AND gate 84 is normally low unless count controller 72 provides a high signal to output 81. While the signal being applied to output 81 is high the output of AND gate 84 will be virtually identical to the output of NAND gate 55. In other words, pulses will only be clocked into counters 85A and 85B while count controller 72 is providing a high signal to output 81.

Thus it can be seen, rate of relative movement is computed by counter 85 only receiving input data for a selected time period. For the maximum count to be reached, the conveyor speed must be sufficient to provide such a count during the selected time period. Generally, it is desirable that a flow rate signal indicative of the upper limit of pump 16, be applied to regulator 12 when the conveyor velocity has reached this point. Since the time period for which velocity is computed remains unchanged, variations in line speed will result in a linear or constant rate of increase or decrease in flow rate. The time period selected, therefore, establishes the desired velocity at which maximum flow rate, or the upper limit of pump output, will be reached. Minimum flow rate selection will be discussed in detail in connection with variable resistor 42.

In the preferred embodiment, counters 85A and 85B are each a Motorola MC14516BCP. As can be seen in FIG. 2, the inputs and outputs of the counters are arranged such that 85A and 85B are preset binary up counters which, when reset, are programmed to begin counting at zero. The output of counters 85A and 85B are tied directly to latches 101A and 101B. The counters are reset by an appropriate pulse from NAND gate 86, the inputs of which will be described in more detail in connection with controller 95. Thus, the sensed relative movement signal is stored by counting and latching in response to a time control signal and an output is generated reflecting the movement occurring during the timed signal. A rate of movement signal is therefore transmitted to converter 102.

When counters 85A and 85B have reached a maximum count, the data input to flipflop 87 becomes low, which results in a high $\overline{Q}$ output 87' when a rising edge is sensed. Indication circuitry 88 is activated by the output at 87' and serves to notify the user of apparatus 10 that such a condition exists. As will become readily apparent, when a maximum count has been reached, a corresponding flow rate signal will be transmitted from apparatus 10 to the regulator 12. Pump 16 generally but not necessarily at this point is at its upper limit or at a preselected maximum flow rate. By changing the count duration period, by adjusting knob 40, the desired rate of relative movement, at which the maximum flow rate will occur is changed. For example, if maximum count and therefore maximum flow rate were reached while the substrate was moving at the desired rate of 100 meters per minute, reduction of the time constant would vary the relation of maximum flow rate to substrate velocity, such that maximum flow rate could now not be reached until the substrate velocity had increased. An appropriate output signal from controller 95 serves to reset flipflop 87.

NAND gate 89 serves to reset or enable flipflop 90. The output of AND gate 65 serves as one input to NAND gate 89 and the $\overline{Q}$ output 98 of the first phase of quadflipflop controller 95 serves as its other input. In the preferred embodiment, flipflop 90 is a Motorola MC14013BCP and quadflipflop controller 95 is a Motorola MC14175BCP. With two normally high inputs the output of NAND gate 89 is low. Flipflop 90 has low reset and high data inputs. Thus a rising edge sensed at the clock input will provide a high signal to output 91. A rising edge appearing at the clock input of flipflop 90 occurs when the output 81' of controller 72 goes low during the time period of the preselected time constant and thereafter returns to its normally high level. When this occurs a high signal will be applied to output 91 until a high signal appears at the reset input (the output of NAND gate 89). A high reset will occur when the signal provided to output 97 changes and will be described in greater detail in connection with controller 95.

The high signal at output 91 is transmitted to the set input of flipflop 92. In the preferred embodiment, flipflop 92 is a Motorola MC14013BCP. The output of AND gate 65 is normally a high input to NAND gate 93, the output of which serves as the reset input of flipflop 92. The $\overline{Q}$ output 94 of flipflop 92 is high when the data input is low, since the reset and set inputs are normally low. The normally high signal applied to output 94 serves to indirectly enable controller 72. When a high signal is applied to output 91, the signal applied to output 94 goes low, causing a low input to be provided to controller 72 disabling same. When output 94 next goes high controller 72 will be reset such that the next rising edge of the pulses provided from NAND gate 55 will serve to provide a high signal to output 81 for the duration of the time constant selected by way of knob 40.

The high signal applied to output 91 is also transmitted to the data input of controller 95. Once this input becomes high the next rising edge of the pulse signal from NAND gate 55 sensed at the clock input of controller 95 will cause a high signal to be applied to output 98 and a low signal to be applied to output 97. The reset input 96 of controller 95 receives a normally high signal from the output of AND gate 65. With a low signal being applied to output 97, a high signal is applied to the reset input of flipflop 90. This eventually causes the signal applied to output 91 to become low.

On the next rising edge of the output of NAND gate 55 the signal applied to output 100 becomes high. As hereinbefore mentioned, controller 95 is a quadflipflop device. As can be seen in FIG. 2 the output 98 is connected to input 99. Thus, when the signal applied to output 98 is high the signal applied to output 100 will become high on the next rising edge sensed at the clock input. A high signal being applied to output 100 serves to clock latch 101. In the preferred embodiment, latches 101A and 101B are each Motorola MC14175BCP. The clock input to the latches forces the latches to store the output of counters 85A and 85B. This high signal also serves as a clock input to flipflop 87, which does not have any effect on indication circuitry 88 unless the counters had previously reached the maximum count during the prior count duration time period.

The high signal applied to output 100 also is transmitted to inputs 112 and 114. Input 114 is the input to the fourth phase of the quadflipflop device contained in controller 95 and is only connected thereto for purposes of preventing a floating condition. With the input 112 sensing a high signal, the normally high signal applied to output 113 will become low on the next rising edge sensed at the clock input. When the output 113 goes low a high signal outputs from NAND gate 86 and serves to reset counters 85A and 85B.

When a high signal is applied to output 100, serving to enable latches 101A and 101B, the signal obtained from counters 85A and 85B was stored and an output signal reflective of the movement occurring during the timed signal from controller 72 is generated to the digital to analog converter 102. In the preferred embodiment, converter 102 is a MicroPower Systems MP7523JN. Converter 102 is provided with a precision reference voltage by a bridge circuit comprising resistor 103 and zener diode 104. In the preferred embodiment, zener diode 104 is a Motorola 1N4740. This assures a constant voltage reference source should the voltage change due to external fluctuations. Converter 102 converts the digital signal obtained from latches 101A and 101B and generates an analog current signal to output 110 which when passing through resistor 105 generates a voltage signal reflective of the movement during the preselected time period to the comparison circuitry.

Operation device 10 also contains comparison circuitry for comparing the paths of relative movement to a preselected flow rate signal and therefore generating a signal to regulator 12. The comparison is obtained by comparing the rate of movement signal supplied to output 110 to a preselected flow rate signal established by the divider circuit comprising resistors 103, 107 and 108. The voltage comparison between output 110 and point 109 is simultaneously sensed across resistor 106 and variable resistor 42. In the preferred embodiment resistor 106 is 510 kilohms, resistor 105 is 1.33 kilohms and variable resistor 42 is a 100 kilohms potentiometer.

If variable resistor 42 is set to reflect zero resistance, a signal is generated to the output of variable resistor 42 reflective of the comparison between the computed rate of movement signal and the preselected flow rate signal. The signal thereby applied to regulator 12 will vary the rate of fluid flow substantially proportionally to the rate of relative movement between the dispensing unit and the substrate. Due to the value of the resistors 106 and 105 set forth above, the signal generated at the output of variable resistor 42 will increase in magnitude as the difference between the voltage at output 110 and point 109 decreases.

By adjusting variable resistor 42, the voltage comparison sensed will also include a minimum flow rate signal. That is, when variable resistor 42 was set to reflect zero resistance virtually all of the compared voltage was across resistor 106 leaving no voltage further output of variable resistor 42. As the resistance setting of variable resistor 42 is increased less voltage comparison occurs across resistor 106. If the voltage at output 110 is zero, variable resistor 42 will generate a minimum flow rate signal to conversion circuitry 111. Thus the signal generated to regulator 12 varies the flow rate of the fluid substantially proportionally to the rate of relative movement about a minimum preselected voltage.

Since the preselected minimum flow rate signal applied through variable resistor 42 does not add voltage to the signal applied to output 110, the point at which the preset maximum fluid flow rate occurs will not vary. As previously indicated the increase in flow rate is at a constant rate, or linear, with the increase in conveyor velocity because the preset time constant does not change. This relationship remains at a constant rate, even though a minimum flow rate is applied. When conveyor velocity is zero, pump 16 is still moving. The slope of this linear relationship or the rate at which change occurs will change. For example, if a time constant is selected so that maximum flow rate (Fmax) occurs at a desired velocity, the addition of a minimum flow rate (Fmin) changes the rate of change of the flow rate from zero flow to Fmax, to Fmin to Fmax for zero velocity to desired velocity. Thus, the rate during which flow rate increases as velocity increases will be decreased and the velocity at which Fmax is reached will remain the same.

In the preferred embodiment regulator 12 comprises a Fairchild model T5200 transducer which converts an electrical signal to a proportional 3 to 15 PSIG output pressure. Since the Fairchild Transducer optimally operates on a current signal, conversion circuitry 111 serves to convert the voltage signal applied to its input to a proportional current signal applied to the transducer. Thus it can be seen that the number of pulses from tachometer 30 were counted for a preselected time period; the counting was stopped; the data was latched and transmitted to the transducer and the system was reset, affecting a flow rate of the fluid 17 in response to the relative movement between substrate 15 and dispenser 20.

FIG. 3 discloses the logic timing diagram depicting various outputs of components contained in the circuit shown in FIG. 2, during two cycles of operation. As previously mentioned the time period selected by variable resistor 40 allows 5 pulses from NAND gate 55 to be counted. When the output of AND gate 65 goes high, the outputs of members 66, 89, 93, 71, and 86 are effected. On the next rising edge of the signal from NAND gate 55, output 81 becomes high and allows the output of AND gate 84 to reflect NAND gate 55 until 81 goes low. At that point the rate of movement is determined as the amount of movement and the time in which the movement occured are known. The storage operation is completed when output 100 goes high which serves to latch the count. Between each counting operation outputs 91, 97, 98, 86 and 113 serve to reset the operation device to begin the next cycle. The next cycle begins when the output 113 returns to its normally high state.

In operation the movement sensed by tachometer 30 is received by counter 85 for the time period selected with controller 72. After the time period is completed the latch 101 is enabled storing the count, and presents it to converter 102. Latch 101 will present the same count until it is again enabled. Converter 102 converts the count signal into an analog voltage reflective of the rate of movement and presents this voltage to the comparison circuitry. The comparison circuitry compares the converter voltage to the voltage at point 109, which is reflective of a preselected rate of fluid flow. A signal reflective of the comparison is generated through variable resistor 42. This signal is converted from a voltage to a proportional current and transmitted to regulator 12. The signal transmitted to regulator 12 will not change until latch 101 is enabled.

Although the invention has been described in terms of certain preferred embodiments, those skilled in the art will recognize that other forms may be adopted within the scope of the following appended claims.

We claim:

1. A controller for dispensing fluid onto a substrate in a system having relative movement between the substrate and a dispensing unit, the controller comprising:
   sensing means for sensing the relative movement between the substrate and the dispensing unit and generating a sensor signal reflective of the relative movement;
   regulating means for regulating the flow rate of the fluid to the dispensing unit in response to a control signal; and
   operation means connected to receive the sensor signal, and to supply a control signal to the regulating means, the operation means having means to compute the rate of relative movement from the received sensor signal, means to compare the rate of relative movement to a preselected signal, reflective of a desired maximum flow rate, and means to generate the control signal supplied to the regulating means reflective of the comparison between the computed rate of movement signal and the preselected flow rate signal so that the flow rate of the fluid dispersed from the dispensing unit varies substantially proportionally to the rate of relative movement between the dispensing unit and the substrate so that the amount of dispensed fluid per unit length of substrate is substantially constant.

2. The controller of claim 1, wherein the regulating means comprises:
   a pump for pumping the fluid to the dispensing unit; and
   drive means connected to the pump and to the operation means for driving the pump responsive to the control signal from the operation means.

3. The controller of claim 2, wherein the pump is fluid activated and the drive means comprises:
   a source of second fluid; and
   a flow controller interposed between and connected to the pump, the source of second fluid and the operation means, so that second fluid is provided to the pump in proportion to the signal from the operation means.

4. The controller of claim 3, wherein said second fluid is a gas.

5. The controller of claim 1, further comprising minimum flow rate signal means for generating a preset minimum flow rate signal to the operation means so that the signal generated to the regulating means varies the flow rate of the fluid substantially proportionally to the rate of relative movement above the minimum flow rate signal.

6. The controller of claim 1, wherein said operation means is enabled upon receipt of a power signal from a power source and further comprising a first disable means, connected to receive said power signal and further connected to said operation means, for disabling said operation means for a second preselected time period upon receipt of said power signal.

7. The controller of claim 1, wherein the regulating means comprises a transducer.

8. The controller of claim 1, wherein the comparison means comprises means for sensing the preselected flow rate signal and the computed rate of movement signal and providing an output signal to the generating means reflective of the difference between the flow rate signal and the movement rate signal and which output signal is above a preselected minimum value.

9. The controller of claim 8 wherein the rate of relative movement signal and the preselected flow rate signal are voltages and wherein the means to sense the voltage difference comprises a variable resistor conductively connected to receive the preselected flow rate signal voltage and the rate of relative movement signal voltage and having the variable terminal connected to the generating means.

10. A controller for dispensing fluid onto a substrate in a system having a relative movement between the substrate and the dispensing unit, the controller comprising:
   (a) sensing means for sensing the relative movement between the substrate and the dispensing unit and generating a sensor signal reflective of the relative movement;
   (b) regulating means for regulating the flow rate of the fluid to the dispensing unit in response to a control signal; and
   (c) operation means, connected to receive the sensor signal, for supplying a control signal to the regulating means, the operation means having storage means for storing the movement signal received from the sensing means in response to a timed control signal and generating an output signal reflective of the movement occurring during the timed signal, time period means for generating a timed control signal to the storage means, so that the movement signal is received for a preselected time, first generating means connected to the output of the storage means for generating a signal reflective of the movement during the preselected time period, comparison means, connected to the first generating means for comparing the rate of relative movement to a preselected signal reflective of a desired maximum flow rate, and second generating means, for generating the control signal supplied to the regulating means reflective of the comparison between the computed rate of movement signal and the preselected flow rate signal so that the flow rate of the fluid dispersed from the dispensing unit varies substantially proportionally to the rate of relative movement between the dispensing unit and the substrate so that the amount of dispensed fluid per unit length of substrate is substantially constant.

11. The controller of claim 10, wherein the sensing means comprises means to sense the relative movement and convert the sensed movement into a pulse signal, each pulse representing an increment of movement, and wherein the storage means comprises;

counting means for receiving and counting the pulses of the pulse signal in response to the timed control signal and providing a count signal representing the number of pulses counted; and latch means, connected to receive the count signal for latching and storing the count signal and transmitting same to the comparison means.

12. The controller of claim 11, further comprising second disable means for disabling the controller when the frequency of the pulse signal is below a predetermined frequency.

13. The controller of claim 11, wherein the regulating means is controlled by an analog signal and wherein the storage means further comprises a conversion means for converting the stored count signal to an analog signal and conducting means for conducting said analog signal to said regulating means.

14. A method of controlling the fluid dispensed onto a substrate in a system having relative movement between the substrate and a dispensing unit, comprising the steps of:

sensing the relative movement;

generating a signal reflective of the movement;

computing the rate of movement signal from the movement signal;

comparing the rate of relative movement to a preselected signal reflective of a desired maximum flow rate;

generating a signal reflective of the comparison between the computed rate of movement signal and the preselected flow rate signal; and regulating the rate of supplying fluid to the dispensing unit in response to the comparison signal so that the rate of fluid varies substantially proportionally to the rate of relative movement between the dispensing unit and the substrate so that the amount of dispensed fluid per unit length of substrate is substantially constant.

15. The method of claim 14, wherein the step of generating a signal reflective of the comparison further comprises generating a signal the value of which is above a preselected minimum flow rate value.

* * * * *